United States Patent
Haria et al.

(10) Patent No.: US 10,344,851 B2
(45) Date of Patent: Jul. 9, 2019

(54) METHOD OF CONTROLLING A TRANSMISSION DURING AN UPSHIFT

(71) Applicant: Ford Global Technologies, LLC, Dearborn, MI (US)

(72) Inventors: Hiral Jayantilal Haria, Farmington Hills, MI (US); Yuji Fujii, Ann Arbor, MI (US); Gregory Michael Pietron, Canton, MI (US); Rohit Hippalgaonkar, Livonia, MI (US); Todd Mccullough, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 95 days.

(21) Appl. No.: 15/633,927

(22) Filed: Jun. 27, 2017

(65) Prior Publication Data

US 2018/0372214 A1  Dec. 27, 2018

(51) Int. Cl.
*B60W 10/115* (2012.01)
*F16H 61/02* (2006.01)
*B60W 30/19* (2012.01)

(52) U.S. Cl.
CPC ....... *F16H 61/0204* (2013.01); *B60W 10/115* (2013.01); *B60W 30/19* (2013.01); *B60W 2510/105* (2013.01); *F16H 2306/22* (2013.01); *F16H 2306/44* (2013.01); *F16H 2306/46* (2013.01); *F16H 2306/50* (2013.01); *F16H 2306/52* (2013.01); *Y10T 477/6937* (2015.01)

(58) Field of Classification Search
CPC .......... Y10T 477/6937; F16H 2306/52; F16H 2306/50; F16H 2306/44; F16H 2306/46; F16H 2306/22; B60W 10/115; B60W 30/19; B60W 2510/105
USPC ...................................... 701/59, 60
See application file for complete search history.

(56) References Cited

U.S. PATENT DOCUMENTS

| | | | |
|---|---|---|---|
| 6,098,003 A | 8/2000 | Kozaki et al. | |
| 6,832,978 B2 * | 12/2004 | Buchanan | B60W 10/02 477/174 |
| 7,840,329 B2 | 11/2010 | Katakura et al. | |
| 7,841,455 B2 * | 11/2010 | Maki | F16H 61/061 192/3.58 |
| 8,718,886 B2 * | 5/2014 | Byerly | F16H 61/0437 701/60 |
| 9,056,613 B2 | 6/2015 | Johri et al. | |
| 9,308,908 B2 * | 4/2016 | Chen | F16H 61/0437 |
| 9,365,206 B2 * | 6/2016 | Dunfee, II | B60W 10/113 |

(Continued)

FOREIGN PATENT DOCUMENTS

EP  0783079 A1 *  7/1997  ........... F16H 61/061

*Primary Examiner* — Roger L Pang
(74) *Attorney, Agent, or Firm* — David Kelley; Brooks Kushman, P.C.

(57) ABSTRACT

During a transmission upshift, a torque capacity of an off-going clutch is maintained at a non-zero state during the transition from the torque phase to the inertia phase and throughout a substantial portion of the inertia phase. This permits the inertia phase to be completed faster without an unacceptable increase in output torque during the torque phase. Monotonically reducing the off-going clutch torque and using feedback from an output torque sensor enable sufficiently precise control of the off-going clutch torque capacity during this interval.

14 Claims, 6 Drawing Sheets

(56) References Cited

U.S. PATENT DOCUMENTS

2007/0287589 A1    12/2007  Kadono et al.
2017/0198808 A1*   7/2017   Bulgrien ........... B60W 30/1882
2018/0118217 A1*   5/2018   LaRoche ............ F16H 61/0437

* cited by examiner

FIG. 2 – PRIOR ART

METHOD OF CONTROLLING A TRANSMISSION DURING AN UPSHIFT

TECHNICAL FIELD

This disclosure relates to the field of control systems for automatic transmissions for motor vehicles. More particularly, the disclosure relates to an upshift control strategy in which the off-going shift element is controlled to limit the output torque during an inertia phase.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Discrete ratio transmissions are capable of transmitting power via various power flow paths, each associated with a different speed ratio. A particular power flow path is established by engaging particular shift elements, such as clutches or brakes. Shifting from one gear ratio to another involves changing which shift elements are engaged. In many transmissions, the torque capacity of each shift element is controlled by routing fluid to the shift elements at controlled pressure. A controller adjusts the pressure by sending electrical signals to a valve body.

SUMMARY OF THE DISCLOSURE

A method of shifting a transmission includes increasing a torque capacity of an oncoming shift element to initiate slip across an off-going shift element while controlling a torque capacity of the off-going shift element to a non-zero level. The torque capacity of the off-going shift element is maintained at a positive level through at least half of the inertia phase. The torque capacity of the off-going shift element may be reduced monotonically throughout the torque phase and inertia phase. A measurement of output torque may be used to adjust the capacity of the off-going shift element during the present shift, for future shifts, or both.

In another embodiment, a method of shifting a transmission includes increasing a torque capacity of an oncoming shift element to initiate slip across an off-going shift element and adjusting a torque capacity of the off-going shift element based on a signal from a torque sensor. The torque capacity of the off-going shift element may be controlled to a non-zero level during a transition from a torque phase to an inertia phase. The torque capacity of the off-going shift element may be reduced monotonically throughout the torque phase and the inertia phase.

In another embodiment, a torque capacity of an oncoming shift element is increased during a torque phase to initiate slip across an off-going shift element with non-zero torque capacity. During an inertia phase, the torque capacity of the off-going shift element is adjusted in response to a signal from a torque sensor. The torque capacity of the off-going shift element may be reduced monotonically throughout the torque phase and the inertia phase.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
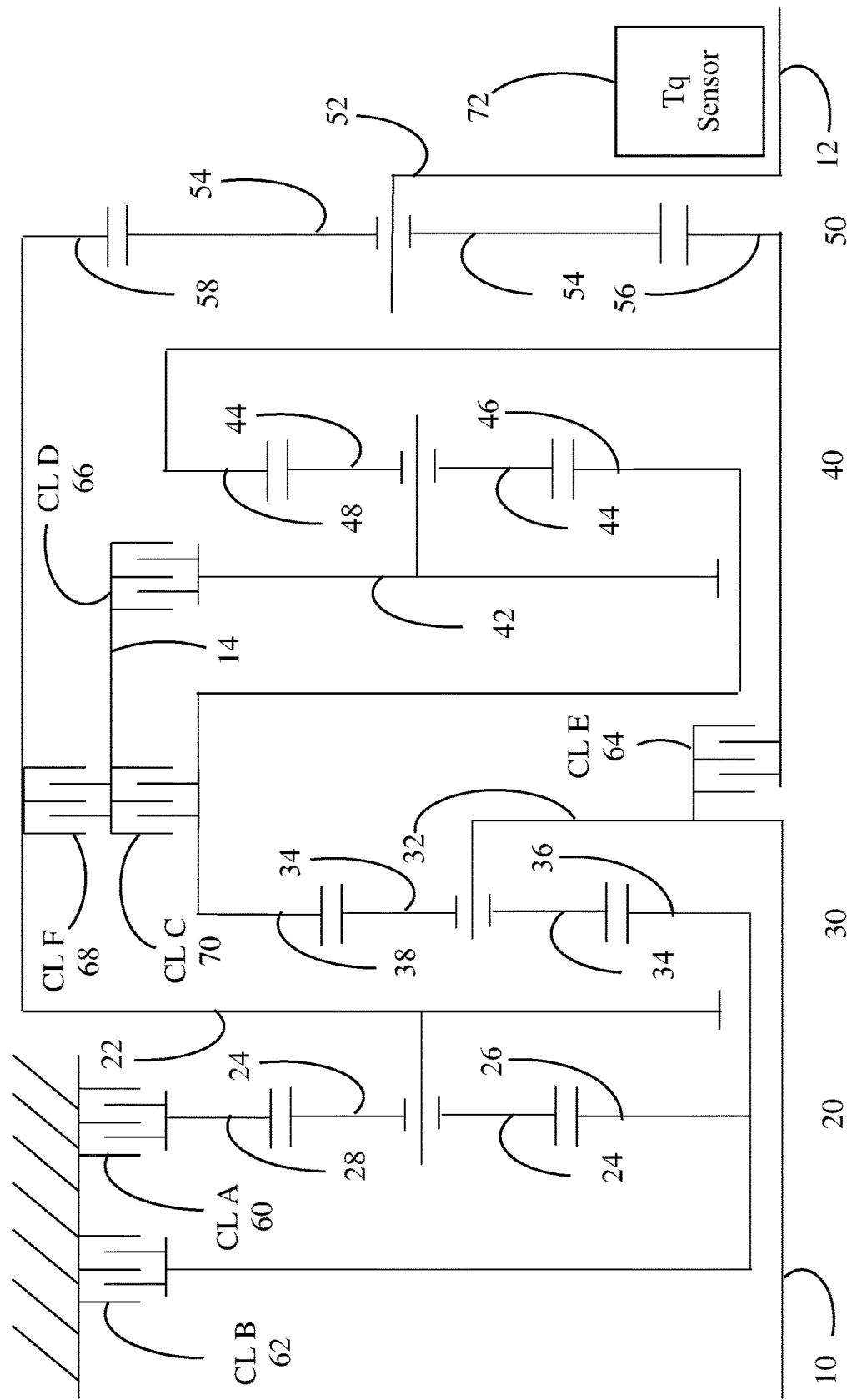
FIG. 1 is a schematic diagram of a transmission system.

An example transmission gearbox is schematically illustrated in FIG. 1. By selectively engaging specified subsets of the shift elements, the gearbox establishes ten forward speed ratios and one reverse speed ratio between turbine shaft 10 and output shaft 12. The transmission utilizes four simple planetary gear sets 20, 30, 40, and 50. Sun gear 26 is fixedly coupled to sun gear 36, carrier 22 is fixedly couple to ring gear 58, ring gear 38 is fixedly coupled to sun gear 46, ring gear 48 is fixedly coupled to sun gear 56, turbine shaft 10 is fixedly coupled to carrier 32, and output shaft 12 is fixedly coupled to carrier 52. Ring gear 28 is selectively held against rotation by brake 60 and sun gears 26 and 36 are selectively held against rotation by brake 62. Turbine shaft 10 is selectively coupled to ring gear 48 and sun gear 56 by clutch 64. Intermediate shaft 14 is selectively coupled to carrier 42 by clutch 66, selectively coupled to carrier 22 and ring gear 58 by clutch 68, and selectively coupled to ring gear 38 and sun gear 46 by clutch 70. A suggested ratio of gear teeth for each planetary gear set is listed in Table 1.

TABLE 1

| | |
|---|---|
| Ring 28/Sun 26 | 2.20 |
| Ring 38/Sun 36 | 1.75 |

TABLE 1-continued

| | |
|---|---|
| Ring 48/Sun 46 | 1.60 |
| Ring 58/Sun 56 | 3.70 |

As shown in Table 2, engaging the clutches and brakes in combinations of four establishes ten forward speed ratios and one reverse speed ratio between turbine shaft 10 and output shaft 12. An X indicates that the shift element is required to establish the speed ratio. An (X) indicates the shift element can be applied but is not required to establish the power flow path. In $1^{st}$ gear, either clutch 68 or clutch 70 can be applied instead of applying clutch 66 without changing the speed ratio. When the gear sets have tooth numbers as indicated in Table 1, the speed ratios have the values indicated in Table 2.

TABLE 2

| | A 60 | B 62 | C 70 | D 66 | E 64 | F 68 | Ratio | Step |
|---|---|---|---|---|---|---|---|---|
| Rev | X | X | | X | | X | −4.79 | 102% |
| Park | X | X | X | | | | | |
| $1^{st}$ | X | X | | (X) | X | | 4.70 | |
| $2^{nd}$ | X | X | X | X | | | 2.99 | 1.57 |
| $3^{rd}$ | X | | X | X | X | | 2.18 | 1.37 |
| $4^{th}$ | X | | X | X | | X | 1.80 | 1.21 |
| $5^{th}$ | X | | X | | X | X | 1.54 | 1.17 |
| $6^{th}$ | X | | | X | X | X | 1.29 | 1.19 |
| $7^{th}$ | | X | | X | X | X | 1.00 | 1.29 |
| $8^{th}$ | | X | | X | X | X | 0.85 | 1.17 |
| $9^{th}$ | | X | X | | X | X | 0.69 | 1.24 |
| $10^{th}$ | | X | X | X | | X | 0.64 | 1.08 |

Torque sensor 72 measures the torque transmitted by output shaft 12. Torque sensor 72 may be, for example, a magneto-elastic torque sensor. In alternative embodiments, a torque sensor may measure the torque transmitted by other shafts from which the torque on the output shaft may be calculated. Alternatively, the torque transmitted by output shaft 12 may be calculated based on speed measurements of transmission components.

In operation, shift elements 60, 62, 64, and 66 are engaged while the vehicle is stopped in Drive such that the vehicle is launched in $1^{st}$ gear. When the vehicle reaches a sufficient speed, the transmission is shifted into $2^{nd}$ gear by releasing shift element 64 and engaging shift element 70. For this shift, shift element 64 is called the off-going element (OFG) and shift element 70 is called the oncoming element (ONC). To effectuate the shift, the controller adjusts the pressures supplied to the apply chambers of these two shift elements.

Figure 2:
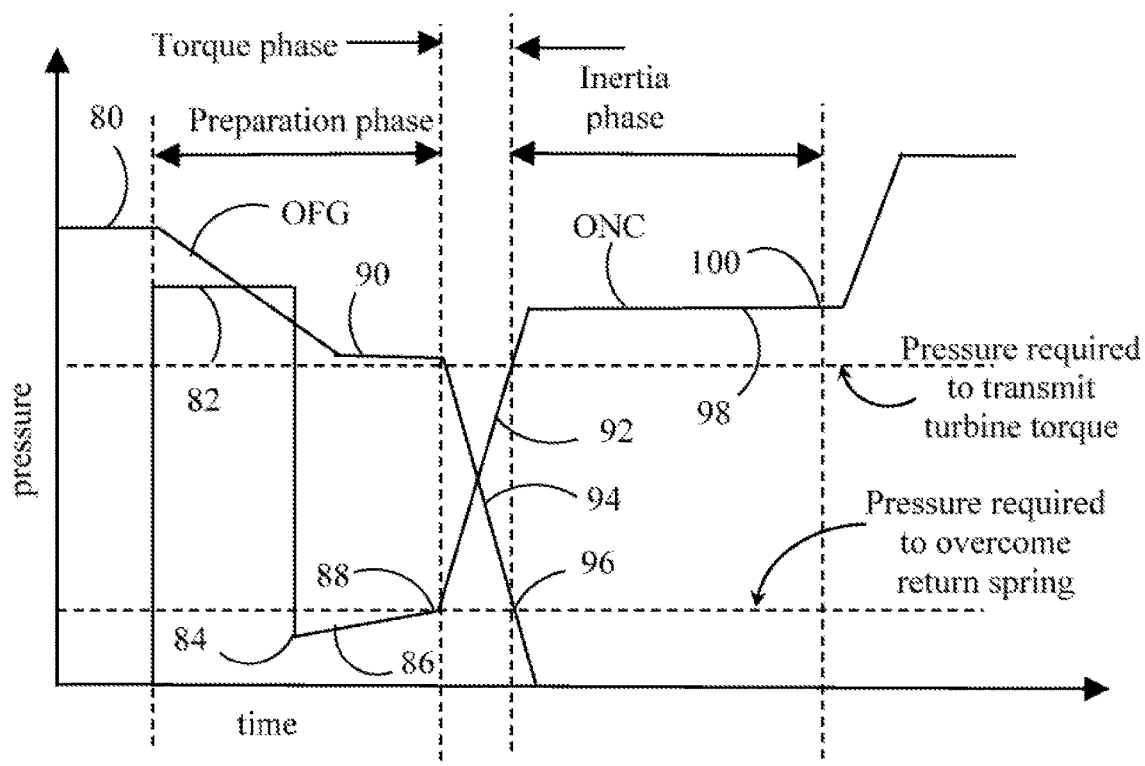
FIG. 2 is a graph of shift element pressures during a conventional upshift of a transmission such as the transmission of FIG. 1.

FIG. 2 illustrates the conventional sequence of pressure commands to effectuate an upshift. For simplicity of illustration, it is assumed that the turbine torque is constant. In practice, the turbine torque may fluctuate. A certain amount of pressure is required to overcome the return spring before the shift element gains any torque capacity. Prior to the shift, the pressure command to the off-going shift element is substantially higher than required to transmit the turbine torque as shown at 80. The pressure command to the oncoming shift element is zero. The shift proceeds in three stages: a preparatory stage, a torque phase, and an inertia phase.

During the preparatory phase, the pressures are manipulated to prepare for the shift. The power transfer path does not change during this phase. The torque ratio and the speed ratio remain in the initial gear. The commanded pressure to the oncoming shift element is raised at 82 for a brief period to rapidly move the piston toward the stroked position. Although the pressure is high, the torque capacity is still zero because the piston is not yet touching the clutch pack. At 84, the pressure is dropped to slightly less than required to overcome the return spring and then gradually increased at 86 to the touch point, which is reached at 88. During the preparatory phase, the pressure of the off-going shift element is gradually reduced to a pressure just slightly above that required to transmit the current turbine torque at 90.

During the torque phase, the pressure of the oncoming shift element is ramped up at 92 while the pressure of the off-going shift element is ramped down at 94. In a conventional shifting process, these are coordinated such that the oncoming shift element reaches a sufficient pressure to transmit the current turbine torque in upshifted gear at very close to the same time that the torque capacity of the off-going shift element reaches zero at 96. During the torque transfer phase, power is transferred from the power flow path associated with the initial gear to the power flow path associated with the upshifted gear. Therefore, the torque ratio changes to the torque ratio of the upshifted gear. The relative speeds of the elements do not change, so the speed ratio remains at the speed ratio of the initial gear.

During the inertia phase, the pressure to the oncoming shift element is raised to a level higher than required to transmit the turbine torque in the upshifted gear. In a conventional shift process, the pressure to the off-going element is reduced to zero to completely disengage the shift element. The excess torque capacity of the oncoming element causes the turbine shaft to slow from the speed ratio associated with the initial gear toward the speed ratio associated with the upshifted gear. The inertia phase ends at 100 when the slip across the oncoming shift element goes to zero. This is also the point at which the speed ratio reaches the speed ratio of the upshifted gear. Following the inertia phase, the pressure to the oncoming shift element is raised substantially above the pressure required to transmit turbine torque, but the actual torque transmitted by the shift element remains at the level required to transmit turbine torque.

Figure 3:
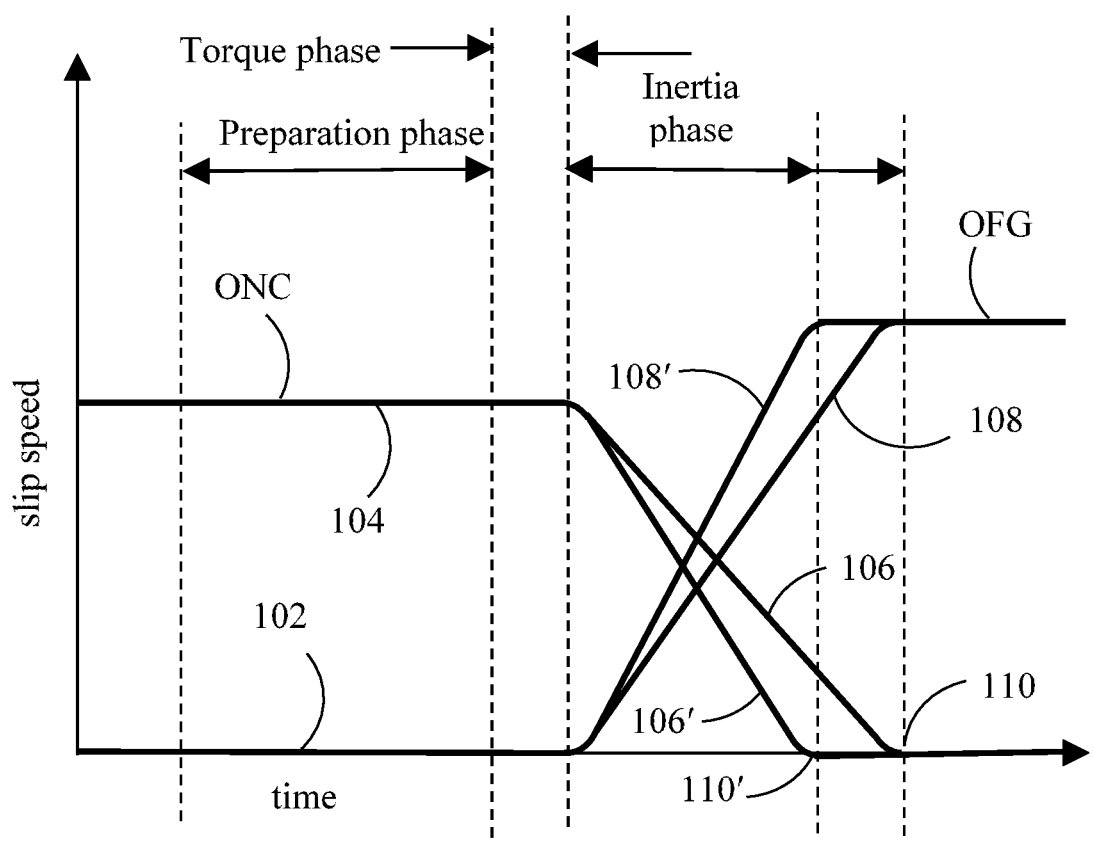
FIG. 3 is a graph of shift element slip speeds during an upshift of a transmission.

FIG. 3 illustrates the slip speed across the shift elements during an upshift. For simplicity of illustration, FIG. 3 assumes that the output speed remains constant during the shift. In practice, the output speed may be increasing due to vehicle acceleration. During the preparatory phase and the torque phase of the upshift, the slip speed across off-going shift element is negligible, as indicated at 102. The slip speed across the oncoming shift element is determined by the element speeds of the initial gear ratio as shown at 104. During the inertia phase, the slip speed across the oncoming shift element declines to zero as shown at 106. Simultaneously, as shown at 108, the slip speed across the off-going shift element increases to a value determined by the element speeds of the upshifted gear ratio. The inertia phase ends when the slip speed across the oncoming shift element reaches zero at 110.

Figure 4:
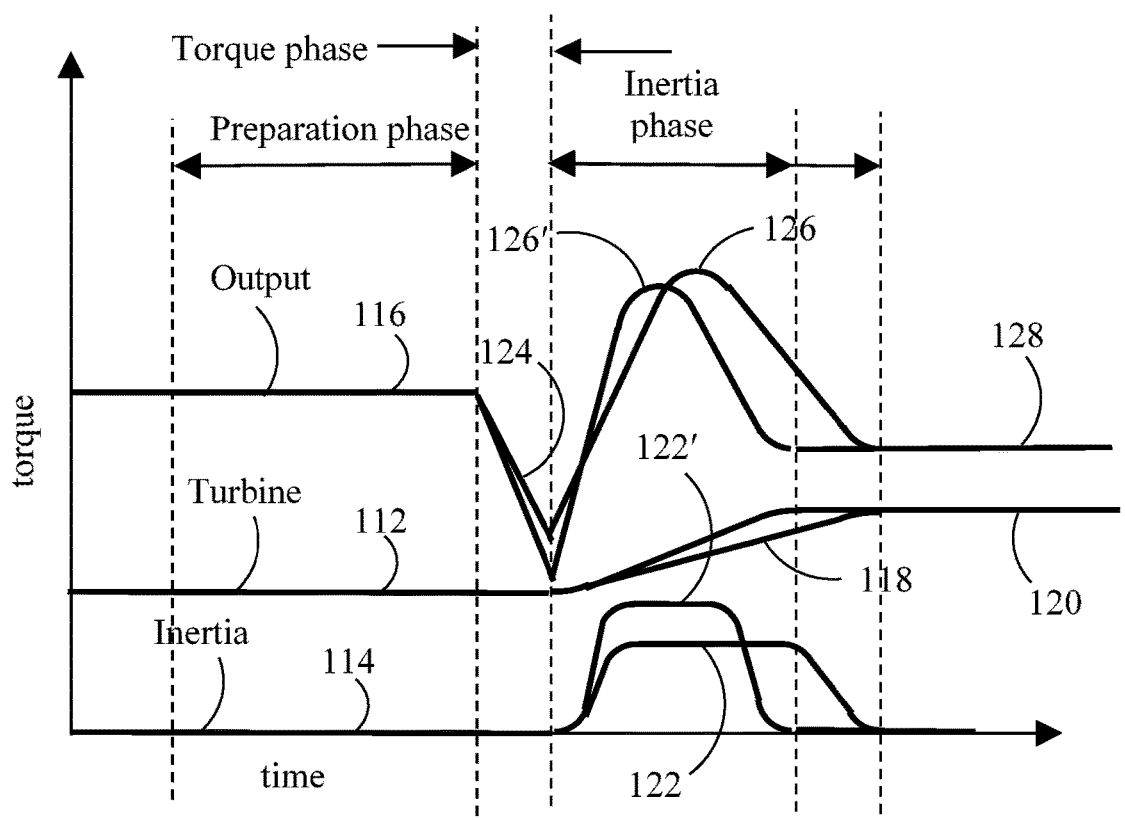
FIG. 4 is a graph of torques during an upshift of a transmission.

FIG. 4 illustrates the torque relationships during an upshift with an open torque converter. There are two sources of input torque to the transmission: the torque generated hydro-dynamically on the torque converter turbine and the torque resulting from input inertia as the turbine changes speed. These two torque sources are illustrated by curves 112 and 114 respectively. The torque at the output shaft is illustrated by curve 116. The turbine torque is related to the turbine speed. During the inertia phase, the turbine torque may gradually increase as the turbine slows down, as indicated at 118, if the torque converter slip rises, given the impeller speed. The turbine torque may remain at the elevated level after the shift, as indicated at 120, if the torque converter slip stays higher, given the impeller speed. The inertia torque is related to the rate of change of the turbine speed. The inertia torque increases during the inertia stage as shown at 122 and then returns to zero after the shift is completed.

The output torque decreases during the torque phase as shown at 124 as the torque ratio decreases to the torque ratio associated with the upshifted gear ratio. During the inertia phase, the output torque is elevated as shown at 126. The elevated output torque and the inertia torque are both a result of the oncoming shift element torque capacity being greater than that required to transmit the turbine torque. As shown at 128, following the upshift, the output torque is less than it was before the upshift due to the reduced torque ratio associated with the upshifted gear. This is mitigated somewhat by the increased turbine torque. The torque fluctuations at 124 and 126 are responsible for the sensations experienced by vehicle occupants. Excessive fluctuations are experienced as unpleasant.

During the inertia phase, the output torque is dictated by the torque capacity of the oncoming shift element. If the torque capacity is raised far above the torque capacity required to transmit turbine torque, the inertia phase will be shorter, but the output torque will be higher. Generally, a short inertia phase is preferable for minimizing heat absorption into the shift element and for minimizing adverse fuel economy impact. However, simply raising the torque capacity of the oncoming shift element higher during the inertia phase creates a high output torque which is unpleasant to vehicle occupants.

Figure 5:
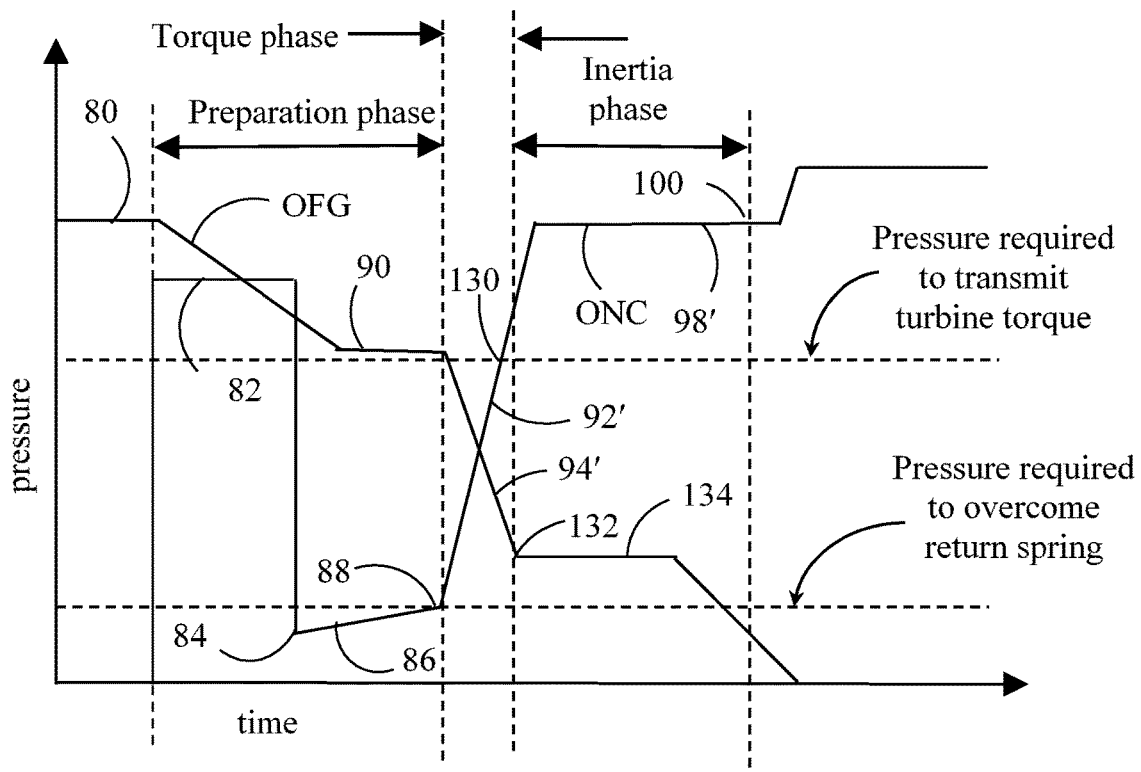
FIG. 5 is a graph of shift element pressures during an upshift of a transmission according to a modified control strategy.

FIG. 5 illustrates a shift process that shortens the inertia phase without causing excessively high output torque during the inertia phase. The preparatory phase is conducted in a conventional manner. During the torque phase, the off-going shift element torque capacity is reduced more slowly, as shown at 94' and the oncoming shift element torque capacity is increased more rapidly, as indicated at 92'. At 130, the torque capacity of the oncoming shift element exceeds the level required to transmit turbine torque. At this point, the torque transmitted by the off-going shift element changes direction from a positive value to a negative value, crossing a zero level. As the torque capacity of the oncoming shift element increases further, the magnitude of the torque transmitted by the off-going shift element increases in the negative direction. The gears are in the state of the so-called tie-up because the off-going shift element is yet to start slipping due to its capacity that is controlled to stay substantially higher than zero. As the torque capacity of the on-coming element rises, the magnitude of the torque exerted onto the off-going element continues to increase in the negative direction. At 132, the magnitude of the transmitted torque equals the torque capacity of the off-going shift element and the off-going shift element begins to slip, while the hydraulic actuator pressure of the off-going element remains substantially higher than the piston stroke level. Instead of further reducing the torque capacity of the off-going shift element at this point, the torque capacity is maintained, as shown at 134, through at least half of the inertia phase. The oncoming shift element torque capacity is raised to a substantially higher level than in a conventional upshift, as shown at 98'. The oncoming shift element both overcomes the resistance of the dragging off-going shift element with enough margin to shorten the inertia phase. The effect of this is shown in FIGS. 3 and 4. As shown at 106' in FIG. 3, the slip across the oncoming shift element decreases more rapidly. As shown at 108', the slip across the off-going shift element increases more rapidly. As shown at 122' in FIG. 4, the inertia torque increases to a higher level, although for a shorter duration relative to a conventional upshift. As shown at 126', the output torque peaks sooner but not higher than in a conventional shift. The reason it does not peak at a higher level is that the dragging off-going shift element reduces the output torque. The dragging off-going shift element would tend to lengthen the inertia phase, but its effect is negated due to the torque capacity of the oncoming shift element which substantially exceeds the level required to transmit turbine torque.

In practice, precise control of shift element torque capacity at relatively low levels is challenging. A variety of noise factors influence the relationship between commanded pressure and torque capacity. For example, seal drag may cause hysteresis when transitioning between increasing pressure and decreasing pressure. A manufacturing variability exists for the return spring stiffness for the hydraulic actuator piston. Transitions between zero torque capacity and non-zero torque capacity are especially problematic due to uncertainty about the location of the piston. Lowering the actuator pressure to the piston stroke level or below introduces a significant difficulty to precisely control the torque capacity of the shift element. Several measures help to make sufficiently precise control of the off-going shift element practical in the proposed method. First, as illustrated in FIG. 5, the torque capacity of the off-going shift element is not reduced to zero until it is to be finally released. Its hydraulic actuator pressure remains substantially higher than the level that corresponds to the return spring force. More specifically, the torque capacity of the off-going shift element is reduced monotonically. Finally, the output torque sensor provides a feedback signal that may be used for closed loop control or for adaptive control.

Figure 6:
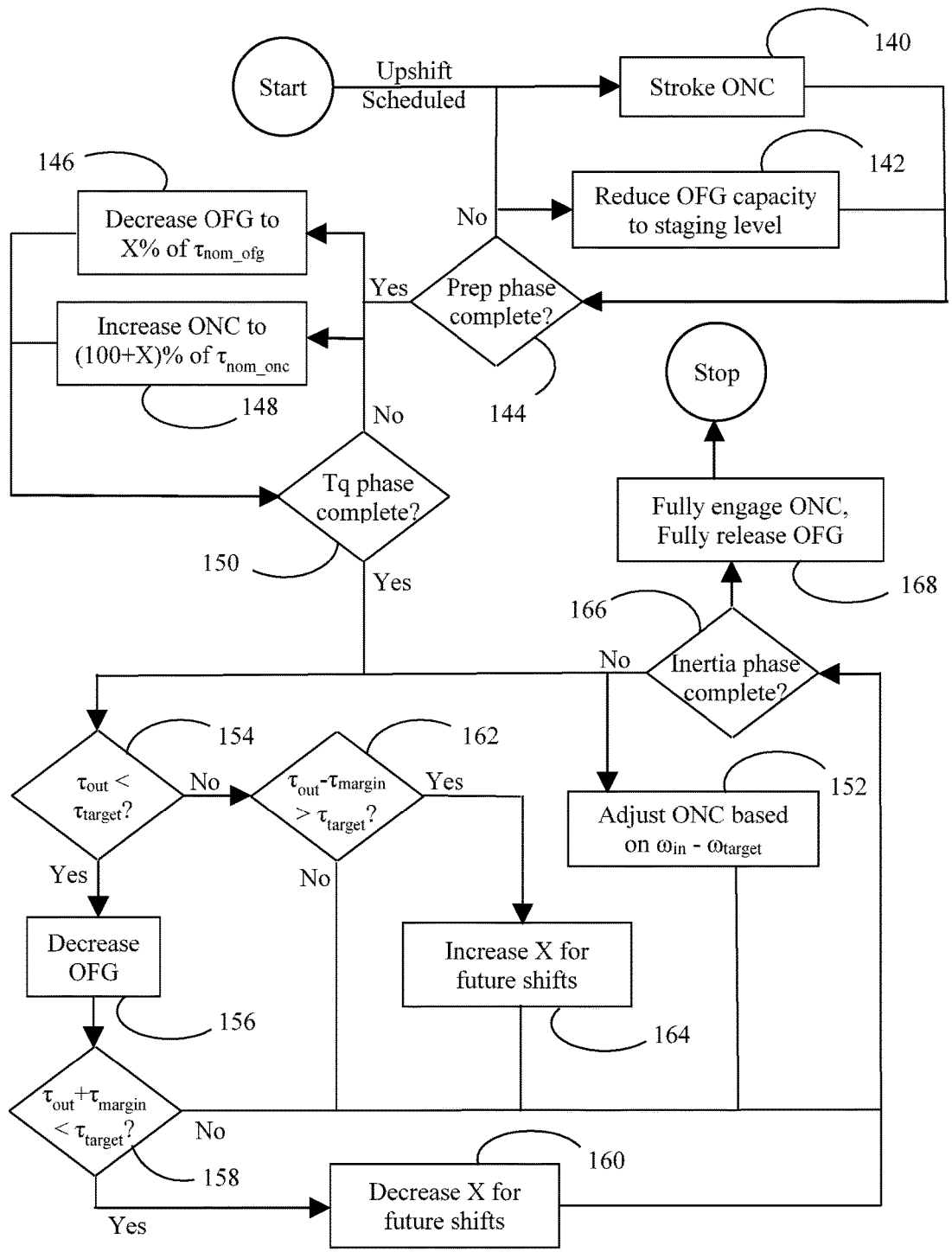
FIG. 6 is a flowchart illustrating the modified control strategy of FIG. 5.

FIG. 6 illustrates the process of FIG. 5 in flowchart form. The process starts when an upshift is scheduled. At 140, the oncoming shift element is stroked, as shown at 82, 84, and 86 in FIG. 5. At 142, the off-going shift element is prepared for tie-up control by reducing the torque capacity to just above that required to transmit turbine torque, as shown at 90 in FIG. 5. At 144, the controller checks whether the preparatory phase is complete and continues executing steps 140 and 142 until it is. At 146, the controller reduces the torque capacity of the off-going shift element to a percentage of $\tau_{nom\_ofg}$, the torque capacity required to transmit the current turbine torque in the initial gear. As discussed below, the percentage is determined during previous shifts to provide a desired output torque profile. At 148, the controller increases the torque capacity of the oncoming shift element to a value greater that exceeds $\tau_{nom\_onc}$, the torque required to transmit turbine torque in the upshifted gear. The gearset is in the state of tie-up when the torque exerted onto the off-going element reverses its direction, crossing the zero level. At 150, the controller checks whether torque phase has completed, as indicated by slip of the off-going shift element, and continues executing steps 146 and 148 until it is.

During the inertia phase, the oncoming shift element is controlled in closed loop at 152. The feedback signal is the difference between the measured turbine shaft speed, $\omega_{in}$, and a target turbine shaft speed, $\omega_{target}$. The target turbine shaft speed may be a function of the output shaft speed and the amount of time since the beginning of the inertia phase. Even if the same formulas are used as in a conventional shift, the resulting oncoming shift element torque capacity can be substantially higher than in a conventional shift due to the dragging off-going shift element. During the inertia phase, the off-going shift element is controlled in a partial closed loop manner at 154 and 156. If the measured output torque, $\tau_{out}$, is less than a target output torque, $\tau_{target}$, at 154, the torque capacity of the off-going shift element is decremented at 156. The measured output torque may be determined directly from an output shaft torque sensor such as 72 or may be calculated based on another torque or speed measurement that is mathematically related to the output shaft torque independent of the oncoming and off-going shift element torque capacities. The target output torque may be a function of the output torque before the shift and the amount of time since the beginning of the inertia phase. The target may be modified based on any change in accelerator pedal position that may occur during the shift. If the measured output torque is less than the target by more than a predetermined margin, $\tau_{margin}$, at 158, then X is decremented at 160 such that a lower off-going shift element torque capacity will be used in future shifts. If the measured output torque exceeds the target at 154, the commanded torque capacity of the off-going shift element is maintained at the present level to keep the torque capacity profile monotonic. However, if the output torque exceeds the target by more than the margin at 162, then X is incremented at 164 to improve future shifts. At 166, the controller checks whether the inertia phase is complete as indicated by the absence of slip across the oncoming shift element. Once the inertia phase is finished, the controller fully engages the oncoming shift element and fully releases the off-going shift element at 168.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A method of shifting a transmission comprising:
   during a torque phase of an upshift, increasing a torque capacity of an oncoming shift element to initiate slip across an off-going shift element while controlling a torque capacity of the off-going shift element to a non-zero level; and
   maintaining positive torque capacity of the off-going shift element through at least a first half of an inertia phase of the upshift to limit an output torque, wherein the torque capacity of the off-going shift element is adjusted based on a measurement of the output torque during a previous upshift.

2. The method of claim 1 wherein positive torque capacity of the off-going shift element is maintained by commanding a hydraulic actuator pressure of the off-going shift element that is substantially higher than a stroke level.

3. The method of claim 1 wherein the torque capacity of the off-going shift element is decreased monotonically throughout the torque phase and the inertia phase.

4. The method of claim 1 wherein the torque capacity of the off-going shift element is adjusted based on a measurement of the output torque during the upshift.

5. The method of claim 1 wherein the torque capacity of the off-going shift element remains constant at the non-zero level during an initial portion of the inertia phase.

6. A method of shifting a transmission comprising:
   during a torque phase of an upshift, increasing a torque capacity of an oncoming shift element to initiate slip across an off-going shift element; and
   during an inertia phase of the upshift, adjusting a torque capacity of the off-going shift element based on a signal from a torque sensor to limit a transmission output torque, wherein the torque sensor directly senses the transmission output torque.

7. The method of claim 6 wherein the torque capacity of the off-going shift element is controlled to a non-zero level during a transition from the torque phase to the inertia phase.

8. The method of claim 7 wherein the torque capacity of the off-going shift element is controlled to the non-zero level by commanding a hydraulic actuator pressure substantially higher than a stroke level.

9. The method of claim 7 wherein the torque capacity of the off-going shift element is decreased monotonically throughout the torque phase and the inertia phase.

10. The method of claim 6 wherein the torque capacity of the off-going shift element remains constant at a non-zero level during an initial portion of the inertia phase.

11. A method comprising:
    during a torque phase of a transmission upshift, increasing a torque capacity of an oncoming shift element to initiate slip across an off-going shift element while controlling a torque capacity of the off-going shift element to a non-zero level; and
    during an inertia phase of the upshift, adjusting the torque capacity of the off-going shift element in response to a signal from a torque sensor to limit a transmission output torque, wherein the torque sensor directly senses the transmission output torque.

12. The method of claim 11 wherein the torque capacity of the off-going shift element is controlled to the non-zero level by commanding a hydraulic actuator pressure substantially higher than a stroke level.

13. The method of claim 11 wherein the torque capacity of the off-going shift element is decreased monotonically throughout the torque phase and the inertia phase.

14. The method of claim 11 wherein the torque capacity of the off-going shift element remains constant at the non-zero level during an initial portion of the inertia phase.

* * * * *